United States Patent
Axelsson et al.

(10) Patent No.: US 9,648,912 B2
(45) Date of Patent: May 16, 2017

(54) SEALING DEVICE FOR GARMENTS

(71) Applicant: SI TECH AB, Brastad (SE)

(72) Inventors: Jonas Axelsson, Brastad (SE); Stig Insulan, Lysekil (SE)

(73) Assignee: SI TECH AB, Brastad (SE)

( * ) Notice: Subject to any disclaimer, the term of this patent is extended or adjusted under 35 U.S.C. 154(b) by 0 days.

(21) Appl. No.: 15/033,206

(22) PCT Filed: Oct. 23, 2014

(86) PCT No.: PCT/EP2014/072742
§ 371 (c)(1),
(2) Date: Apr. 29, 2016

(87) PCT Pub. No.: WO2015/062963
PCT Pub. Date: May 7, 2015

(65) Prior Publication Data
US 2016/0249689 A1    Sep. 1, 2016

(30) Foreign Application Priority Data
Nov. 1, 2013  (EP) .................................. 13191232

(51) Int. Cl.
*F16J 15/02*    (2006.01)
*A41D 3/00*    (2006.01)
(Continued)

(52) U.S. Cl.
CPC ........... *A41D 3/00* (2013.01); *A41D 13/0005* (2013.01); *B29C 45/006* (2013.01); *B29C 45/26* (2013.01);
(Continued)

(58) Field of Classification Search
CPC  F16J 15/10; F16J 15/102; F16J 15/104; F16J 15/02; F16J 15/06; A41D 13/012
See application file for complete search history.

(56) References Cited

U.S. PATENT DOCUMENTS

| | | | |
|---|---|---|---|
| 6,854,459 B1* | 2/2005 | Cox ....................... | A62B 17/04 128/201.22 |
| 7,451,530 B2* | 11/2008 | Meager .................. | A44B 19/16 24/399 |

(Continued)

FOREIGN PATENT DOCUMENTS

| | | |
|---|---|---|
| EP | 1352577 | 10/2003 |
| WO | 99/23902 | 5/1999 |

OTHER PUBLICATIONS

International Search Report and Written Opinion for PCT/EP2014/072742, mailed Feb. 4, 2015.
(Continued)

*Primary Examiner* — Gilbert Lee
(74) *Attorney, Agent, or Firm* — Kagan Binder, PLLC (57) ABSTRACT

The present inventive concept relates to a sealing device (1) for garments to sealingly connect an annular layer (3) and a wearable layer (5) to the sealing device (1). The sealing device (1) comprises an annular base (10) having an inner annular wall portion (12) and an outer annular wall portion (14), a recess (30) at least partly defined by the inner annular wall portion (12) and the outer annular wall portion (14), and an annular sealing surface (40) for circumferentially and sealingly connecting the annular layer (3) to the annular base (10). The sealing device (1) further comprises an annular sealing body (60) adapted to be locked into the recess (30) to circumferentially and sealingly connect the wearable layer (5) between the annular base (10) and the annular sealing body (60). At least one of the inner annular wall portion (12) and the outer annular wall portion (14) is provided with a plurality of sections (50, 52) in the circumferential direction, each section having a stiffness different from a stiffness of a neighboring section.

15 Claims, 7 Drawing Sheets

(51) Int. Cl.
*A41D 13/00* (2006.01)
*B63C 11/04* (2006.01)
*B29C 45/00* (2006.01)
*B29C 45/26* (2006.01)
*B29C 45/40* (2006.01)
*B29K 21/00* (2006.01)
*B29K 101/12* (2006.01)
*B29L 31/26* (2006.01)

(52) U.S. Cl.
CPC .............. *B29C 45/40* (2013.01); *B63C 11/04* (2013.01); *F16J 15/021* (2013.01); *B29K 2021/00* (2013.01); *B29K 2101/12* (2013.01); *B29L 2031/26* (2013.01)

(56) References Cited

U.S. PATENT DOCUMENTS

| | | | |
|---|---|---|---|
| 8,028,351 B2* | 10/2011 | Stachler | A41D 13/0005 |
| | | | 2/455 |
| 2005/0066429 A1 | 3/2005 | Tang et al. | |
| 2010/0314839 A1* | 12/2010 | Enserink | F16J 15/025 |
| | | | 277/630 |

OTHER PUBLICATIONS

European Search Report for European Application No. 13191232.1, mailed Mar. 4, 2014.

\* cited by examiner

SEALING DEVICE FOR GARMENTS

CROSS-REFERENCE TO RELATED APPLICATIONS

This application claims priority to International Application No. PCT/EP2014/072742, filed Oct. 23, 2014, and titled "A SEALING DEVICE FOR GARMENTS", which in turn claims priority from European Application having Ser. No. 13/191,232.1, filed on Nov. 1, 2013, both of which are incorporated herein by reference in their entireties.

TECHNICAL FIELD OF THE INVENTION

The present invention relates to a sealing device for garments, specifically to a sealing device for sealingly connecting two layers in e.g. a fluid tight, water tight, gas tight and/or air tight relation.

BACKGROUND OF THE INVENTION

Garments in e.g. a diving suit, a protection suit, a spray deck of the cockpit in a kayak, etc. are often used to seal the wearer, or certain parts of the wearer, from e.g. a fluid such as water or contaminated air/gas. In e.g. a diving suit, the garment around the neck may need to be sealingly connected to a diving cap/helmet in order for the wearer to be sealed from the surroundings when diving. Similarly, the feet and hands of the wearer, i.e. garment around the wrists and cuffs of the diving suit, may need to be sealingly connected to diving gloves and diving boots, respectively. In another example, the paddler of a kayak often desires to prevent water from entering through the cockpit into the kayak, and therefore uses a wearable garment (a so called spray deck) which is sealingly connected to the kayak. Thus, for many applications, there is a need to sealingly connect a layer, e.g. the neck of a diving suit or portions around the cockpit of a kayak, to a wearable layer, e.g. a diving cap/helmet or the spray deck of a kayak, respectively.

A solution for sealingly connecting parts of a diving suit is presented in EP 1 352 577, where the diving suit is provided with releasable water-tight seals around the wrists, ankles and neck. Each releasable water-tight seal includes first and second complementary shaped annular interlocking seal members connected to the diving suit and suit elements such as gloves or boots, respectively. In EP 1 352 577 one member is provided with an undercut hook-shaped rib that mates with at least one complementary shaped channel in the other member.

The size and complex design of the sealing device in EP 1 352 577 makes it suitable for relatively advanced clothing, such as heavy diving suits and survival suits. However, there is a need for a smaller and simpler sealing device applicable to e.g. waterproof jackets.

SUMMARY OF THE INVENTION

An object of the present inventive concept is to alleviate the drawbacks of prior art. This and other objects, which will become apparent in the following description, are accomplished by a sealing device as defined in the accompanying claims.

The present inventive concept is based on the realization that a sealing device for sealing an annular layer and a wearable layer to the sealing device, may be better adapted for a variety of applications if an annular base of the sealing device is adapted to firmly seal the wearable layer to the sealing device with the aid of an annular sealing body, while at the same time being bendable in order to be adaptable to the form of the annular layer. For example, if the annular layer is worn by a wearer, the sealing device may be better adapted to the body of the wearer. Furthermore, if the base of the sealing device is bendable, the sealing device may be arranged e.g. on a relatively low-weight garment and still be pliably adapted to the form and contours of that garment. Thus, the inventive concept is based on the combination of two conflicting interest. The first being to have a base which is rigid enough to firmly hold and lock the sealing body in order to seal the wearable layer to the sealing device, the rigidity of the base leading to a relatively stiff and non-pliably adaption of the base to the annular layer. The second being to have a base which is flexible or bendable enough to be pliable adapted to the annular layer.

According to at least one aspect of the present inventive concept, a sealing device for garments to sealingly connect an annular layer and a wearable layer to said sealing device is provided. The sealing device comprises:

an annular base comprising:
an inner annular wall portion, an outer annular wall portion extending circumferentially around said inner annular wall portion, a recess at least partly defined by said inner annular wall portion and said outer annular wall portion, and an annular sealing surface for circumferentially and sealingly connecting said annular layer to said annular base;
an annular sealing body adapted to be locked into said recess to circumferentially and sealingly connect said wearable layer between said annular base and said annular sealing body;
wherein at least one of said inner annular wall portion and said outer annular wall portion is provided with a plurality of sections in the circumferential direction, each section having a stiffness different from a stiffness of a neighbouring section.

Hereby, a sealing device suitable for various applications and of a less complex design compared to prior art, is provided for. The sealing device of the inventive concept may preferably be used for relatively light-weight garments such as e.g. waterproof jackets. By providing/dividing at least one of said inner and outer annular wall portions with sections, wherein the stiffness of at least two neighbouring sections are different, the annular base portion may be more bendable/flexible and hence more pliable and adaptable to the annular layer. Furthermore, by providing sections wherein the stiffness of at least two neighbouring sections are different, the overall stiffness of the annular base may still be great enough for a firm hold of the annular sealing body.

It should be understood that when referring to a certain stiffness of a section, the bending resistance of that section is important. In other words, how tightly or firmly that section holds the annular sealing body in the recess when the annular sealing body is in an assembled condition with the annular base. That is, the stiffness of a section is a relative measurement of the pressure of which the concerned annular wall portion (or portions) exerts on the annular sealing body in the recess in the assembled condition. Hence, by stating that the stiffness of a first section is different from a stiffness of a second section, it is indicated that the pressure of which the annular wall portion (or portions) of the first section exerts on the annular sealing body in the recess is either larger or smaller compared to the annular wall portion (or portions) of the second section.

The use of the sealing device for garments should be understood that at least one of the layers to be sealed to the sealing device is a garment. For example, the sealing device may be sealingly connected to the annular layer of a kayak, and sealingly connected to the so called spray deck or spray shirt worn around the body of a kayak paddler, the latter layer being the wearable layer. The term wearable layer should be understood as a layer which is worn, e.g. a glove or a glove-shaped layer to sealingly reach the inside of a bag, or the spray deck or spray shirt already mentioned, or a silicone or latex seal. The sealing device may be used to seal two garments and/or two wearable layers to the sealing device. For example, the neck portion of a jacket or diving suit may be sealingly connected to the annular sealing surface of the sealing device, the neck portion being the annular layer, and circumferentially and sealingly connected to a neck seal, or helmet by the annular sealing body, the neck seal or helmet being the wearable layer.

The annular shape of the sealing device and its various parts are to be understood as ring-shaped, i.e. as formed/shaped around an origin. The annular shape may e.g. be circular, essentially circular, oval, elliptical or formed in any other annular form. Thus, the sealing device may be formed to fit around the body e.g. the waste of a human, and/or limbs of a human, such as e.g. the neck, arms, hands, legs and wrists of a human.

It should be understood that the sealing device, and its related parts, e.g. the annular base and its annular wall portions, have an extension in the circumferential direction, i.e. in a direction around a periphery of the annular base, and an extension in the radial direction, i.e. in a direction perpendicular to the circumferential direction and directing from the inner annular wall portion towards the outer annular wall portion. In other words, the sealing device, and the annular base and the annular sealing body, may be described with cylindrical coordinates ($\rho$, $\phi$, z), the circumferential direction corresponding to the direction of the angle $\phi$ of the angular coordinate $\phi$, the radial direction corresponding to a direction in the radial distance $\rho$, and the direction perpendicular to both the circumferential direction and the radial direction corresponding a direction along the height z.

According to at least one example embodiment, both of said inner annular wall portion and said outer annular wall portion are provided with a plurality of sections in the circumferential direction, each section having a stiffness different from a stiffness of a neighbouring section.

A specific section is preferably comprised by connecting portions of the inner annular wall portion and the outer annular wall portion, in the radial direction.

According to at least one example embodiment, the at least one section in said plurality of sections has a different thickness compared to its neighbouring section, said thickness being defined in the direction from said inner annular wall portion to said outer annular wall portion, i.e. in the radial direction.

Thus, the stiffness of at least two neighbouring sections is different by means of having different thickness. Hereby, a relatively simple means for providing sections with different stiffness are provided for. According to one example, all of the sections in the plurality of sections may have a different thickness, or the thickness may be alternated such that e.g. every other section has the same thickness. Other variations of the thickness of the sections are within the scope of the present inventive concept.

According to at least one example embodiment, the at least one section in said plurality of sections comprises a first material, and wherein its neighbouring section comprises a second material, said second material being different from said first material.

Thus, the stiffness of at least two neighbouring sections may be different by means of having different material, e.g. by that the inherent properties of the first material entails a different stiffness compared to the second material, or that said first material has a different density, e.g. by means of cavities in the material, entailing a different stiffness compared to the second material. Hereby, the annular base may provide for a uniform radial cross section along its circumference.

According to at least one example embodiment, said inner annular wall portion and/or said outer annular wall portion comprises an annular strengthening portion connecting at least every other section with each other.

Hereby, the overall stiffness of the annular base may be varied. For example, the strengthening portion may be made large in order to increase the stiffness of the sections and to more firmly hold/lock the annular sealing body in the recess, or in order to reduce the bendable properties of the annular base. The strengthening portion may be provided along the circumference of said inner annular wall portion and/or said outer annular wall portion, preferably along an edge of said inner annular wall portion and/or said outer annular wall.

According to at least one example embodiment, said annular base comprises an annular shoulder arranged in said recess for preventing said annular sealing body to be released when locked into said recess, said annular shoulder being arranged on the same inner annular wall portion and/our said outer annular wall portion as said annular strengthening portion but on an opposite side to said annular strengthening portion.

The annular shoulder is preferably arranged along the circumference of the annular base. Hereby, the shoulder and the strengthening portion together provide for an increased stiffness of the sections, and/or provide for a better locking of the annular sealing body to the recess.

According to at least one example embodiment, the annular sealing body comprises a lip, adapted to be arranged in said recess, preferably juxtaposition with said shoulder when said annular sealing body is locked into said recess.

Said strengthening portion may preferably extend further in the direction being perpendicular to both the circumferential direction and the radial direction (i.e. the z-direction) compared to the inner and/or outer annular wall, in order for a user to grip and bend the strengthening portion in the radial direction such that the recess is enlarged and the annular sealing body may be released from the recess. This may be desirable when the layer being sealingly connected to the sealing device by the annular sealing body is to be removed and/or replaced.

According to at least one example embodiment, said annular base comprises an annular flange arranged circumferentially to said inner annular wall portion and/or said outer annular wall portion.

According to at least one example embodiment, said annular flange extends from said outer annular wall portion with an angle of over 90°.

Preferably, if the annular base is to be connected to a neck portion of e.g. a jacket or a diving suit, the angle may be e.g. between 120° and 150°, e.g. approximately 135°, in order to facilitate the pliable adaption of the annular base to the shoulder parts of the neck portion.

According to at least one example embodiment, said annular flange is an extension of said inner annular wall portion.

Hereby, the annular flange provides for an easy connection with a cuff portion of e.g. a jacket or the wrist portion of e.g. a pair of pants or a diving suit.

According to at least one example embodiment, said annular sealing surface is arranged on said annular flange for circumferentially and sealingly connecting said annular layer by at least one of the following: adhesive means, welding, moulding, casting, laces.

The annular flange may be circumferentially and sealingly connected to the annular layer by any means known in the art. It should be understood that the annular layer is to be sealed to the annular sealing surface of said flange along the whole circumference of the annular flange in order to seal a space inside the sealing device from a space outside the sealing device. The annular sealing surface may be provided on either side or both sides of the annular flange.

According to at least one example embodiment, said annular sealing surface is arranged in said recess, and wherein said annular sealing body is adapted to be locked into said recess to circumferentially and sealingly connect said annular layer between said annular sealing surface and said annular sealing body.

Thus, both the annular layer and the wearable layer may be circumferentially and sealingly connected to the recess of the annular base by the annular sealing body. For example, in an assembled condition of the sealing device, i.e. when the annular sealing body is locked into the recess, the annular layer may be arranged furthest into the recess, and the wearable layer may be arranged between the annular layer and the annular sealing body in the recess. Hereby, the wearable layer may be removed and/or replaced without removing the annular layer from the recess.

According to at least one example embodiment, said annular sealing surface is a first annular sealing surface, and said annular base comprises a second sealing surface, said second sealing surface being arranged on said annular flange for circumferentially and sealingly connecting said annular layer by at least one of the following: adhesive means, welding, moulding, casting, laces, and said first annular sealing surface is arranged in said recess, and wherein said annular sealing body is adapted to be locked into said recess to circumferentially and sealingly connect said wearable layer between said first annular sealing surface and said annular sealing body.

According to at least one example embodiment, said annular sealing body is adapted to be snap fitted into said recess.

Preferably, in an unassembled condition of the sealing device, i.e. when the annular sealing body is not locked into the recess of the annular base, the size and dimension of the recess, e.g. a cross section of the recess in the radial direction, is slightly smaller compared to the size and dimension of the annular sealing body, e.g. a cross section of the annular sealing body in the radial direction. However, when the annular sealing body is locked into the recess, by e.g. the means of an assembling tool, the material of the annular base allows for the recess to widen and the annular sealing body to be firmly locked into the recess. Hence, the sections of a larger stiffness will exert a larger pressure on the annular sealing body compared to the sections of a lesser stiffness.

Thus, according to at least one example embodiment, said annular base comprises a flexible material e.g. plastic such as polyurethane, or rubber or silicone.

According to at least one example embodiment, said annular base is moulded, e.g. injection-moulded or casted.

Hence, the annular base may be in one piece, and/or the annular sealing body may be made in one piece.

Hereby, a cost-effective and yet case-by-case adaptable method for producing the sealing device is provided for.

According to at least a second aspect of the present inventive concept, the use of a sealing device according to the first aspect of the present inventive concept (and any embodiments thereof) is provided for. The use of the sealing device comprising the step of circumferentially and sealingly connect an annular layer to said annular sealing surface by adhesive means, welding, moulding, casting, and/or laces, and circumferentially and sealingly connect a wearable layer into said recess by snap locking said annular sealing body into said recess. Hereby, said wearable layer will be secured between the annular base and the annular sealing body.

According to at least one example embodiment, the use of the sealing device comprising the step of circumferentially and sealingly connect the neck and/or cuffs of a jacket or suit, such as e.g. a diving suit, to said annular sealing surface by adhesive means, welding, moulding, casting, and/or laces, and circumferentially and sealingly connect a sealing cuff by locking said sealing cuff into said recess by said annular sealing body.

According to at least a third aspect of the present inventive concept, a method for producing a sealing device according to the first and second aspect and any embodiments thereof is provided for. Said method comprising the steps of:

providing a first mould corresponding to the size and shape of the annular base, moulding, such as injection-moulding a plastic or moulding a rubber, into said first mould for forming said annular base, providing a second mould corresponding to the size and shape of the annular sealing body, moulding, such as injection-moulding a plastic or moulding a rubber, into said second mould for forming said annular sealing body, releasing said annular base and said annular sealing body from said first mould and said second mould.

Hereby a cost effective and yet simple way of producing said sealing device is provided for.

BRIEF DESCRIPTION OF THE DRAWINGS

The present inventive concept will now be described in more detail, with reference to the illustrative and non-limiting appended drawings showing example embodiments of the inventive concept, wherein:

FIG. 1b illustrates in cross-section a detail of the example embodiment in FIG. 1a;

FIG. 3b illustrates in cross-section a detail of the example embodiment in FIG. 3a;

DETAILED DESCRIPTION OF THE DRAWINGS

The above, as well as additional objects, features and advantages of the present inventive concept, will be better understood through the following illustrative and non-limiting detailed description of example embodiments of the present inventive concept, with reference to the appended drawings where the same reference numerals will be used for similar elements.

Figure 1A:
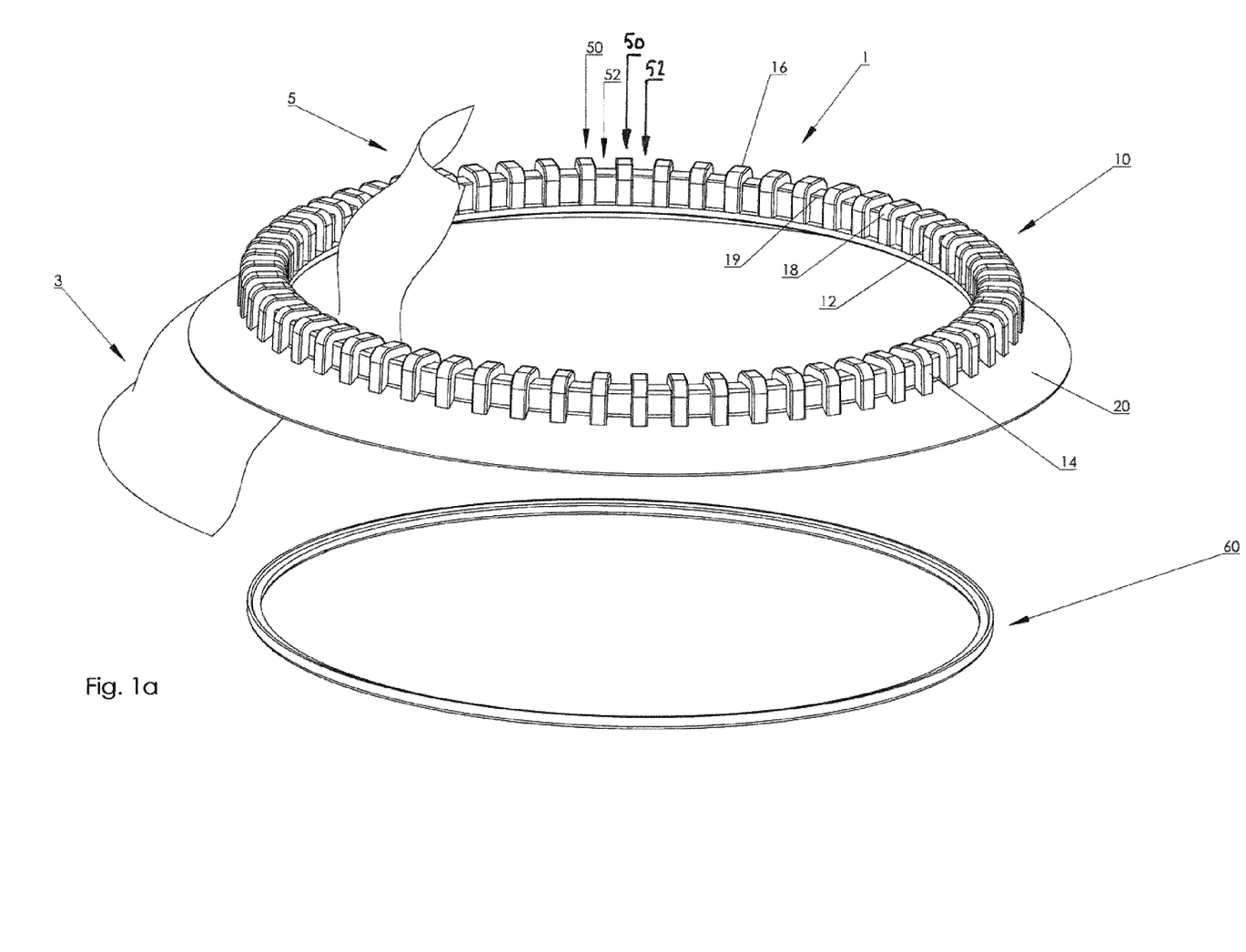
FIG. 1a is a perspective, partly exploded view illustrating a sealing device according to least one example embodiment of the inventive concept.
Figure 1B:
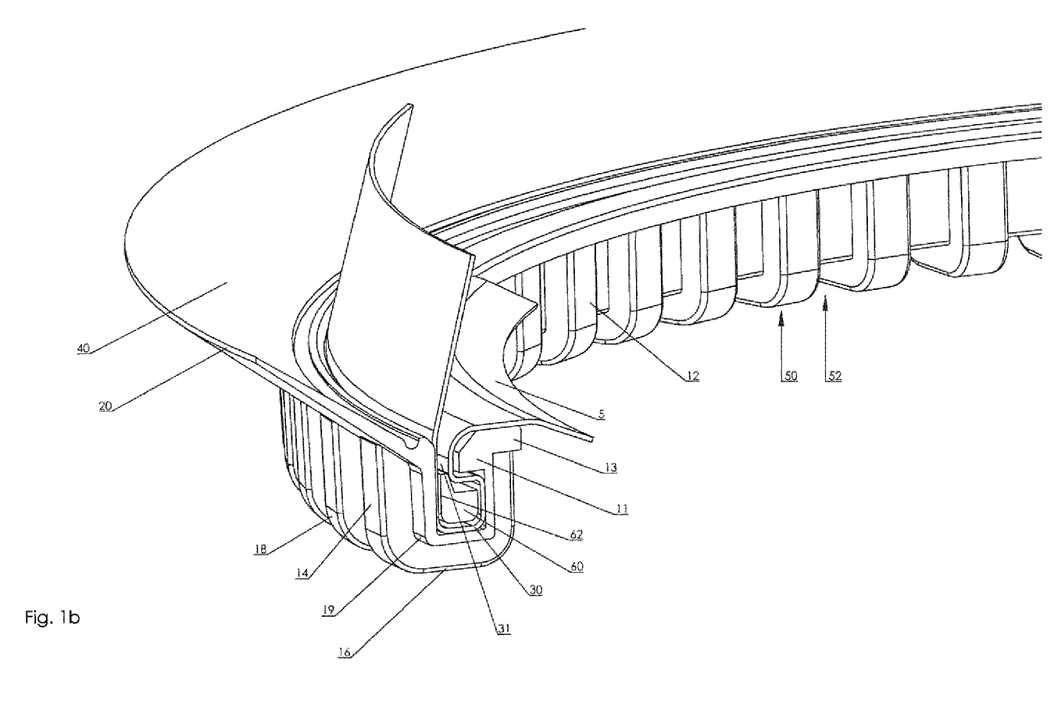

FIG. 1a illustrate a sealing device 1 for garments to sealingly connect an annular layer 3 and a wearable layer 5 to the sealing device 1, specifically suited for sealing the neck portion 3 of a diving suit or jacket to a neck seal 5. FIG. 1b illustrates in cross-section a detail of the sealing device 1 in FIG. 1a.

The sealing device 1 comprises an annular base 10 and an annular sealing body 60. The annular base 10 comprises an inner annular wall portion 12, an outer annular wall portion 14 extending circumferentially around the inner annular wall portion 12, and a connecting annular wall portion 16 connecting the inner annular wall portion 12 and the outer annular wall portion 14. A recess 30 (shown only FIG. 1b) is arranged on the opposite side of the connecting annular wall portion 16, and is defined by the inner annular wall portion 12, the outer annular wall portion 14 and the connecting annular wall portion 16. The sealing device 1 in FIG. 1a further comprises an annular flange 20 extending circumferentially of the outer annular wall portion 14. In FIGS. 1a and 1b, the annular flange 20 has a radial extension in a direction heading away from the outer annular wall portion 14, with an angle between the radial extension of the annular flange 20 and the outer annular wall portion 14 of over 90°, e.g. between 120° and 150°, e.g. approximately 135°. An annular sealing surface 40 (shown only FIG. 1b) is comprised on at least one side of the annular flange 20. An annular flange 20 may be connected to both the inner annular wall portion 12 and the outer annular wall portion 14, i.e. the annular base 10 may be provided with two annular flanges 20.

It should be understood that the sealing device 1, e.g. the annular base 10 and its related parts, e.g. the annular wall portions 12, 14, 16, have an extension in the circumferential direction, i.e. in a direction around a periphery of the annular base 10, and an extension in the radial direction, i.e. in a direction perpendicular to the circumferential direction and directing from the inner annular wall portion 12 towards the outer annular wall portion 14. In other words, the sealing device 1, and the annular base 10 and the annular sealing body 60, may be described with cylindrical coordinates ($\rho$, $\phi$, z), the circumferential direction corresponding to the direction of the angle $\phi$ of the angular coordinate $\phi$, the radial direction corresponding to a direction of the radial distance $\rho$, and the direction perpendicular to both the circumferential direction and the radial direction corresponding to a direction of the height z.

In FIGS. 1a and 1b, the inner annular wall portion 12, the outer annular wall portion 14 and the connecting annular wall portion 16 are provided with/divided into a plurality of sections in the circumferential direction. Each section extends from the inner annular wall portion 12 to the outer annular wall portion 14, via the connecting annular wall portion 16. As illustrated in FIGS. 1a and 1b, there are two different types of sections, a first type section 50 where the inner annular wall portion 12, the outer annular wall portion 14 and the connecting annular wall portion 16 are all flat and connected to each other by curved transitions 18, and a second type section 52 where the inner annular wall portion 12, the outer annular wall portion 14 and the connecting annular wall portion 16 are all flat and connected to each other by essentially sharp transitions 19. However, the transitions 18 of the first type section 50 may be similar to the transitions 19 of the second type section 52, that is both transitions 18, 19 may be curved or essentially sharp. According to yet at least one example embodiment, the inner annular wall portion 12 may be directly connected to the outer annular wall portion 14 with or without a transition, e.g. to constitute a common rounded wall portion, for at least one of the first and second type section 50, 52. The recess 30, being defined by an inside of the annular wall portions 12, 14, 16 have a shape corresponding to the annular walls in at least one of the first and second type section 50, 52. As illustrated in FIG. 1b, the recess is square-shaped as the inner sides of the inner annular wall portion 12, the outer annular wall portion 14 and the connecting annular wall portion 16 is square-shaped.

In FIGS. 1a and 1b, the first type section 50 and the second type section 52 are arranged alternatively in such a way that each section of the first type section 50 has two neighbouring sections of the second type section 52. The sections of the first type section 50 and sections of the second type section 52 have different thickness, the thickness being defined in the radial direction, i.e. in the direction from the inner annular wall portion 12 to the outer annular wall portion 14. Sections of the second type section 52 also have a smaller extension in a direction perpendicular to both the circumferential direction and the radial direction (i.e. in the z-direction) compared to sections of the first type section 50. According to at least one example embodiment, a further type section, such as a third and/or a fourth type section is provided in the circumferential direction of the inner and/or outer annular wall portions 12, 14. The further type section having a stiffness being the same or different compared to the first type section 50 and/or the second type section 52.

The function of the sealing device 1 in FIGS. 1a and 1b will now be described in detail.

The sealing device 1 comprises an annular sealing body 60 which is adapted to be locked into the recess 30 to circumferentially and sealingly connect the wearable layer 5 between the annular base 10 and the annular sealing body 60, as illustrated in the assembled condition in FIG. 1b. In FIG. 1a, the sealing device 1 is in an unassembled condition with regards to the wearable layer 5, as the annular sealing body 60 is not locked into the recess 30.

The size and dimension of a cross section in the radial direction of the recess 30 corresponds largely to the size and dimension of a cross section in the radial direction of the annular sealing body 60. In the unassembled condition, the size and dimension of the recess 30 may be somewhat smaller compared to the size and dimension of the annular sealing body 60. As the annular base 10 preferable is made of a flexible material, e.g. by a plastic such as polyurethane or rubber or silicone, the size and dimension of the recess 30 may be expanded as the annular sealing body 60 is pressed into the recess 30. Thus, in the assembled condition, at least the inner annular wall portion 12 and the outer annular wall portion 14 exerts a pressure on the annular sealing body 60, via the wearable layer 5, in such a way that the wearable layer 5 is sealingly secured between the annular sealing body 60 and the recess 30, as the annular sealing body 60 is locked into the recess 30. In other words, the inside of each of the inner annular wall portion 12 and the outer annular wall portion 14 exerts a pressure on the annular sealing body 60, via the wearable layer 5, in order to secure said wearable layer between the annular base 1 and the annular sealing body 60.

The pressure of which the at least the inner annular wall portion 12 and the outer annular wall portion 14 exerts on the annular sealing body 60 is depended on the stiffness of the sections. As illustrated in FIGS. 1a and 1b, sections of the first type section 50, is thicker than sections of the second type section 52, and thereby exert a larger pressure on the annular sealing body 60 as the stiffness of the sections of the first type section 50 is larger compared to sections of the second type section 52. In FIGS. 1a and 1b, the alternating arrangement of the sections of the first and second type section 50, 52, provides for that each section has a stiffness different from a stiffness of its neighbouring section. Hereby, the sections of the annular base 10, and more specifically, at least the inner annular wall portion 12 and the outer annular wall portion 14 exerts a pressure to hold the annular sealing body 60 in the recess 30 in order to sealingly connect the annular base 10 to the wearable layer 5 along the whole periphery of the recess in the circumferential direction, while at the same time provide for a flexibility of the annular base 10 such that the annular base 10 may be more bendable around an axis of the annular base 10, e.g. bendable when a force is applied in a direction perpendicular to the circumferential and radial direction (i.e. in the z-direction) compared to an annular base without such sections.

According to at least one example embodiment, at least one of the inner annular wall portion 12, the outer annular wall portion 14 and the connecting annular wall portion 16 is provided with/divided into a plurality of sections in the circumferential direction, wherein each section has a stiffness being different from a stiffness of each of the other sections.

As illustrated in FIG. 1b, the annular base 10 may comprises an annular shoulder 11 arranged in the recess 30 for preventing the annular sealing body 60 to be released when locked into the recess 30. Correspondingly, the annular sealing body 60 may comprise a lip 62 extending towards an opening 31 of the recess 30, possibly in juxtaposition to the shoulder 11 and possible extending outside the opening 31 of the recess 30. The lip 62 helps to prevent the annular sealing body 60 to move in the circumferential direction during e.g. assembling/unassembling of the annular sealing body 60 to the recess 30.

The annular sealing body 60 may be released from the recess 30 by gripping a strengthening portion 13 connecting at least the sections of the first type section 50. The user may grip and bend the strengthening portion 13 in the radial direction such that the recess 30 is enlarged and the annular sealing body 60 may be released from the recess 30. This may be desirable when the wearable layer 5 being sealingly connected to the annular base 10 by the annular sealing body 60 is to be removed and/or replaced.

The annular sealing surface 40 is adapted to circumferentially and sealingly connect the annular layer 3 to the sealing device 1 e.g. by means of an adhesive, by welding, by moulding, by casting, by laces or by any other suitable means. It should be understood that the annular layer 3 may be attached to the annular sealing surface 40 by any means applicable, the important feature being that the annular sealing surface 40 is sealingly connected to the annular layer 3 along the whole circumference of the annular sealing surface 40.

The angle of over 90°, e.g. between 120° and 150°, e.g. approximately 135°, between the outer annular wall portion 14 and the annular flange 20 is chosen to fit the angle of the shoulders of a wearer, thus making the sealing device 1 suitable for sealingly connecting a neck portion 3 of a diving suit or jacket to e.g. a neck seal 5.

Figure 2:
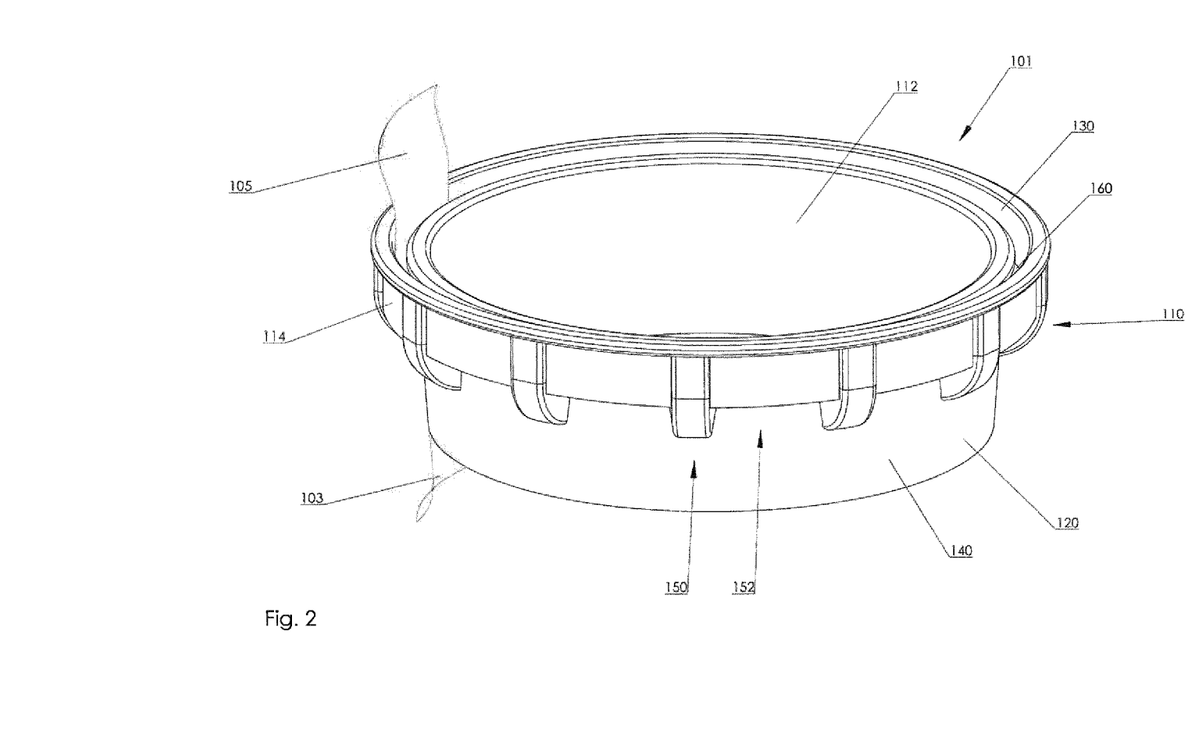
FIG. 2 is a perspective view illustrating a sealing device according to at least one example embodiment of the inventive concept.

In FIG. 2 a sealing device 101 for garments similar to the sealing device 1 described with reference to FIGS. 1a and 1b is illustrated. Sealing device 101 is suited for sealing the cuff and/or wrist portion 103 of a diving suit or jacket to a wrist and/or cuff seal 105 respectively. That is, to sealingly connect an annular layer 103 and a wearable layer 105 to the sealing device 101. Similar or corresponding parts, portions and elements between FIGS. 1a and 1b and FIG. 2 will be referred to with corresponding reference numerals, but with the addition of the value "100" for the reference numerals in FIG. 2, i.e. reference numeral "30" indicating the recess 30 in FIGS. 1a and 1b will be referred to with reference numeral "130" indicating a recess 130 in FIG. 2. These parts, portions and elements will not be explained further if the structure and function are essentially the same as for the sealing device 1 of FIGS. 1a and 1b.

An annular flange 120 in FIG. 2 extends in a direction perpendicular to the circumferential and radial direction (i.e. in the z-direction) of an annular base 110, and may be seen as an extension of an inner annular wall portion 112. Similar to FIGS. 1a and 1b, the annular flange 120 may comprise an annular sealing surface 140 for circumferentially and sealingly connecting the annular layer 103 to the sealing device 101 e.g. by means of an adhesive, by welding, by moulding, by casting, by laces or by any other suitable means. The annular flange 120, and thus the annular sealing surface 140, being an extension of the inner annular wall portion 112 makes it suitable for sealingly connect a glove 105 or cuff sealing 105 to the cuff portion 103 of e.g. a jacket or a diving suit, or to sealingly connect a boot 105 to the wrist portion 103 of e.g. a pair of rain pants or a diving suit.

Similar to FIGS. 1a and 1b, the wearable layer 105 may be locked into the recess 130 of the annular base 110 by an annular sealing body 160. In FIG. 2, an outer annular wall portion 114 is provided with/divided into a plurality of sections in the circumferential direction. There are two different types of sections, a first type section 150 comprising a flat part and a rounded part, the rounded part tapering in a direction being perpendicular to the circumferential direction and the radial direction (i.e. in the z-direction), and a second type section 152 comprising only a flat part. Sections of the first type section 150 extend further in the direction perpendicular to the circumferential and radial direction (i.e. in the z-direction) compared to sections of the second type section 152. Thus, sections of the first type section 150 comprises more material compared to section of the second type section 152, providing for a larger stiffness of sections of the first type section 150. Hereby, a pressure of which at least the inner annular wall portion 112 and the outer annular wall portion 114 exert on the annular sealing body 160 is larger for sections of the first type section 150. In FIG. 2, the alternating arrangement of the sections of the first and second type section 150, 152, provides for that each section has a stiffness different from a stiffness of its neighbouring section. Hereby, the sections of the annular base 110, and more specifically, the inner sides of the inner and outer annular wall portions 112, 114 exert a pressure to hold the annular sealing body 160 in the recess 130 in order to sealingly connect the annular base 110 to the wearable layer 105 along the whole periphery of the recess 130 in the circumferential direction, while at the same time provide for a flexibility of the annular base 110 such that the annular base 110 may be more bendable when a force is applied in a direction perpendicular to the circumferential and radial direction (i.e. in the z-direction) compared to an annular base without such sections.

Figure 3A:
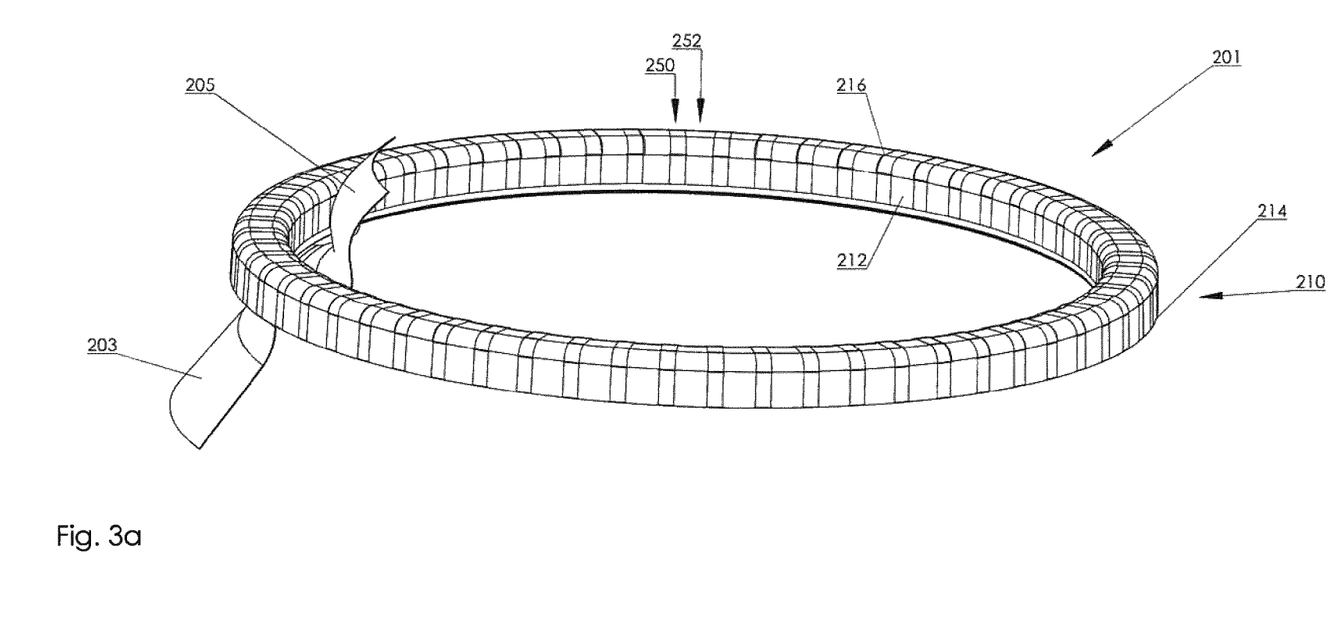
FIG. 3a is a perspective view illustrating a sealing device according to at least one example embodiment of the inventive concept.
Figure 3B:
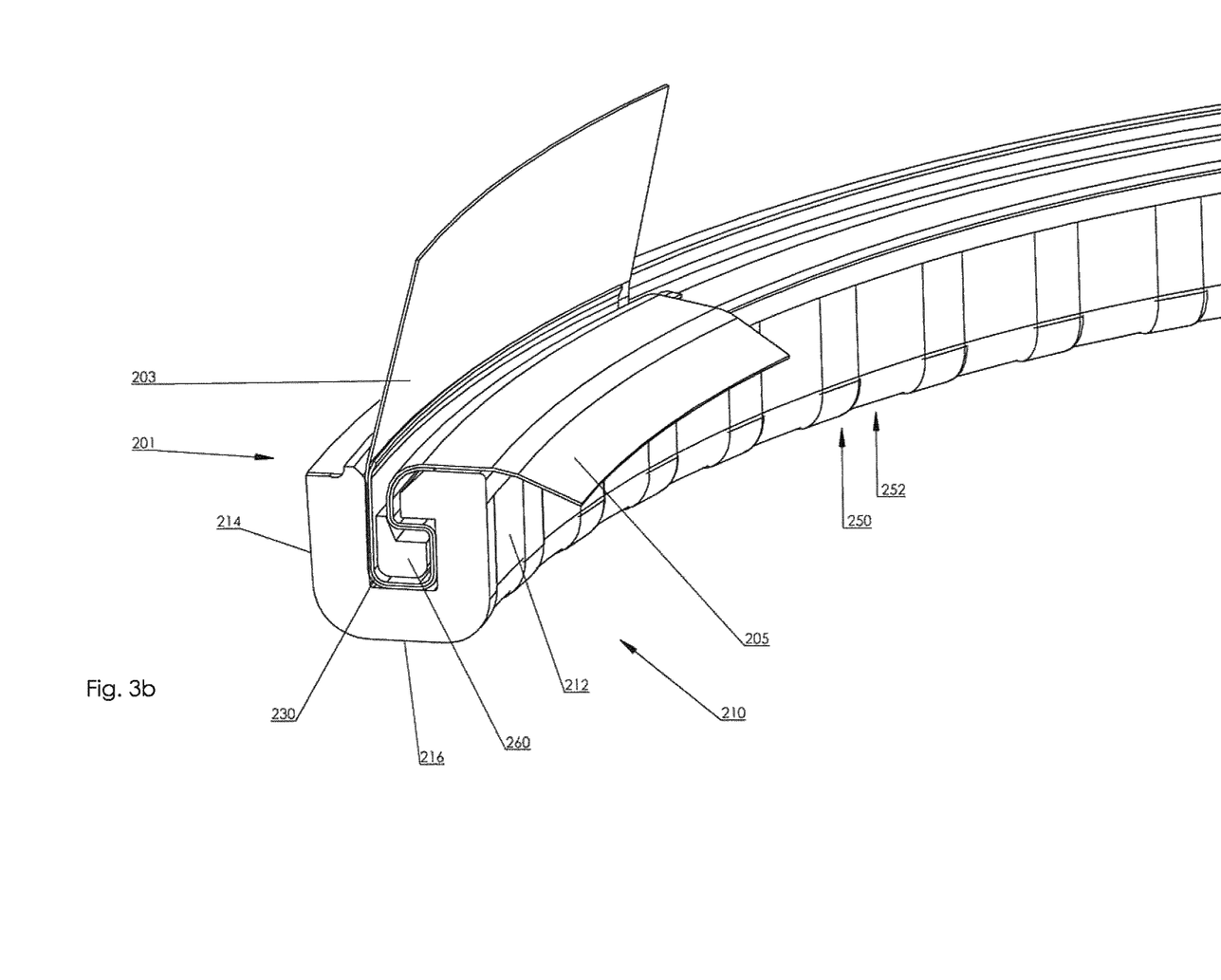

In FIGS. 3a and 3b, sealing device 201 for garments similar to the sealing device 1 in FIGS. 1a and 1b, is illustrated. Sealing device 201 is suited for e.g. sealing the neck portion 203 of a diving suit or jacket to neck seal 205, or e.g. the annular portion 203 around the cockpit of a kayak to a body seal (e.g. the spray deck or spray skirt) 205. That is, to sealingly connect an annular layer 203 and a wearable layer 205 to the sealing device 201. Similar or corresponding parts, portions and elements between FIGS. 1a and 1b and FIGS. 3a and 3b will be referred to with corresponding reference numerals, but with the addition of the value "200" for the reference numerals in FIG. 3, i.e. reference numeral "30" indicating the recess 30 in FIGS. 1a and 1b will be referred to with reference numeral "230" indicating a recess 230 in FIGS. 3a and 3b. These parts, portions and elements will not be explained further if the structure and function is essentially the same as for the sealing device 1 of FIGS. 1a and 1b.

In FIGS. 3a and 3b, the wearable layer 205 and the annular layer 203 may be locked into the recess 230 (shown only in FIG. 3b) of the annular base 210 by an annular sealing body 260 (shown only in FIG. 3b). In FIGS. 3a and 3b, the inner annular wall portion 212, the outer annular wall portion 214, and the connecting annular wall portion 216 are provided with/divided into a plurality of sections in the circumferential direction. There are two different types of sections, a first type section 250 comprising a first material, and a second type section 252 comprising a second material being different from the first material of sections of the first type section 250. The first material provides for a larger stiffness of the sections of the first type section 250 compared to sections of the second type section 252. Hereby, a pressure of which the at least the inner annular wall portion 212 and the outer annular wall portion 214 exerts on the annular sealing body 260 is larger for sections of the first type section 250. In FIG. 3, the alternating arrangement of the sections of the first and second type section 250, 252, provides for that each section has a stiffness different from a stiffness of its neighbouring section. Hereby, the sections of the annular base 210, and more specifically, the inner sides of the inner and outer annular wall portions 212, 214 exert a pressure to hold the annular sealing body 260 in the recess 230 in order to sealingly connect the annular base 210 to the wearable layer 205 and the annular layer 203 along the whole periphery of the recess 230 in the circumferential direction, while at the same time provide for a flexibility of the annular base 210 such that the annular base 210 may be more bendable when a force is applied in a direction perpendicular to the circumferential and radial direction (i.e. in the z-direction) compared to an annular base without such sections. The annular layer 203 is preferably locked into the recess in such a way that it is arranged further into the recess 230 compared to the wearable layer 205. The wearable layer 205 is preferably locked into the recess 230 in such a way that it is arranged between the annular layer 230 and the annular sealing body 260. Hereby, the wearable layer 205 may be exchanged without removing the annular layer 203 from the recess 230.

Figure 4:
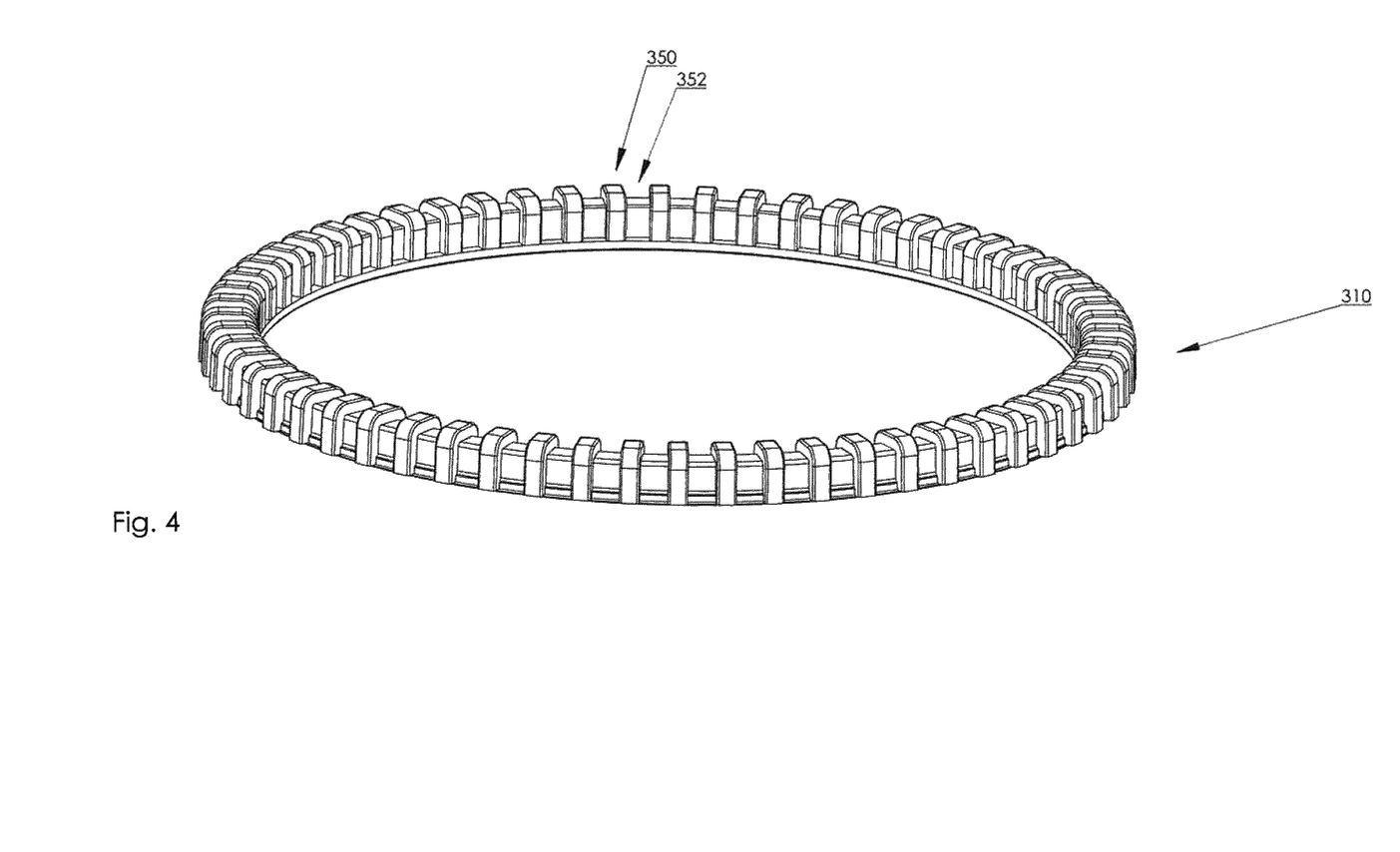
FIG. 4 illustrates an annular base according to at least one example embodiment of the inventive concept.

FIG. 4 illustrates an example embodiment of the annular base 310 similar to the annular base 1 of FIGS. 1a and 1b, the difference being that the annular base 310 in FIG. 4 is lacking a flange. Thus, an annular layer and a wearable layer are preferably locked into the recess similar to the function described with reference to FIGS. 3a and 3, but with sections of a first type section 350 and a second type section 352 similar to that of FIGS. 1a and 1b.

Figure 5:
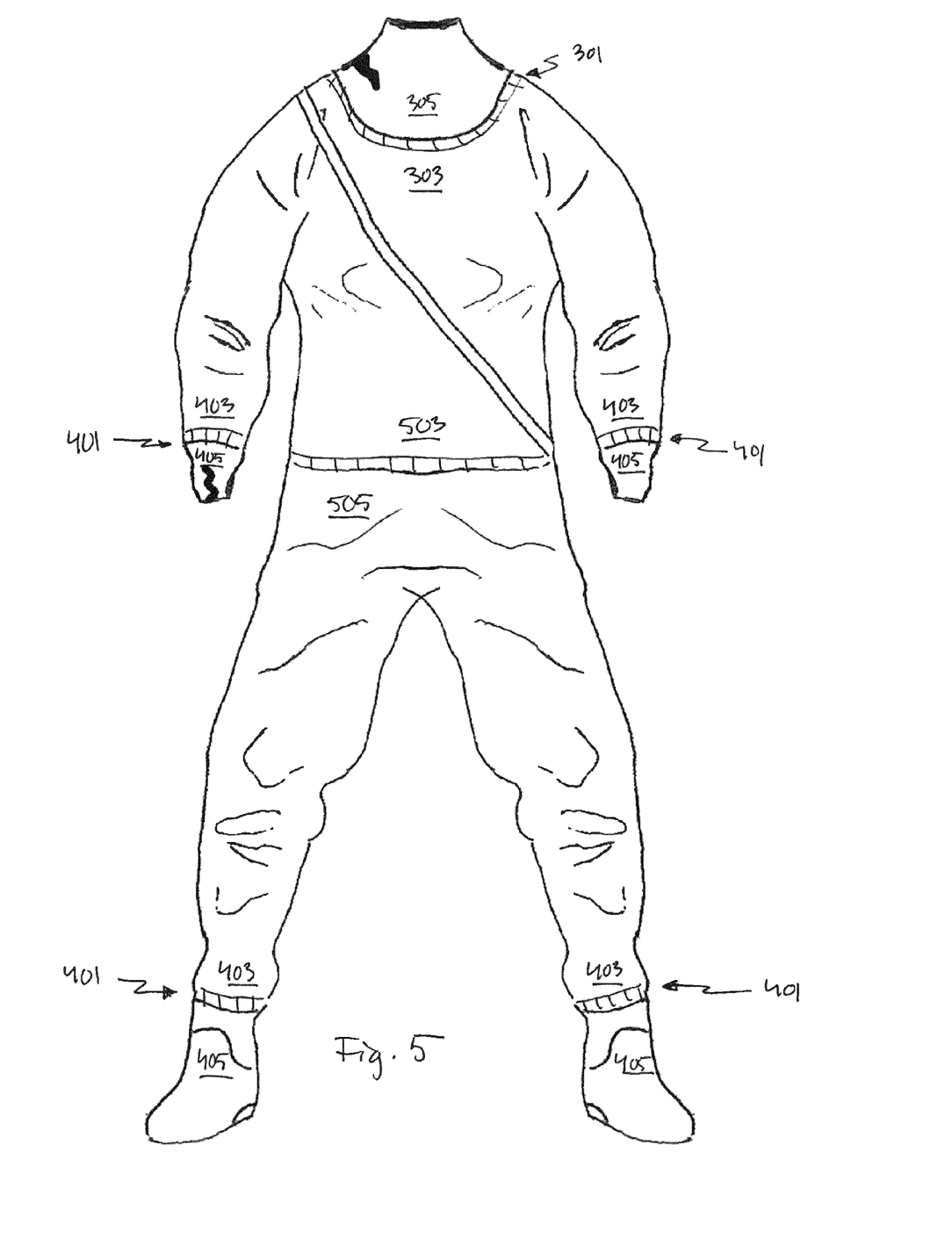
FIG. 5 illustrates the use of a sealing device according to at least one example embodiment of the inventive concept.

FIG. 5 illustrates the use of sealing devices 301, 401, 501 in a suit such as e.g. a diving suit or a jacket, e.g. a rain jacket, and pants, where the neck portion 303, the cuffs of the arms 403 and wrists of the legs 403, and the waistline 503 are provided with such sealing devices 301, 401, 501. The neck portion 303 and the waistline portion 503 are preferably provided with a sealing device 301, 501 similar to the embodiments described in relation to FIGS. 1a and 1b, and/or FIGS. 3a and 3b, while the cuffs of the arms 403 and the wrists 403 of the pants preferably are provided with a sealing device 401 similar to the embodiment described in relation to FIG. 2.

For the neck portion 303, the sealing device 301 may sealingly and circumferentially connect the neck portion 303 around its periphery by means of e.g. adhesive, welding means, moulding means, casting means, laces or the like, to a neck seal 305. The neck seal 305 being circumferentially and sealingly connected to the sealing device 301 as previously described. Similarly, the waistline 503 and a waistline seal 505, or a pair of pants 505, are sealingly and circumferentially connected to the sealing device 501 around its periphery by means of e.g. adhesive, welding means, moulding means, casting means, laces or by being locked into a recess of the sealing device by an annular sealing body as previously described. The sealing devices 401 may circumferentially and sealingly connect the cuffs of the arms 403 to e.g. hand seals 405 or gloves 405, and the wrist of the pants 403 to e.g. a boot 405, to the sealing device 401 by means previously described.

It should be noted that the sealing device 1, 101, 201, 310, 401, 501 presented here is specifically suited for an easy removal and replacement of the layer being locked into the recess by the annular sealing body 60, 160, 260 e.g. the wearable layer 5, 105, 205, 305, 405, 505. Hence, if the wearable layer 5, 105, 205, 305, 405, 505 for some reason are broken or dysfunctional, the wearable layer 5, 105, 205, 305, 405, 505 may easily be replaced by removing the annular sealing body and realising the wearable layer 5, 105, 205, 305, 405, 505 and replacing it with a new layer.

The person skilled in the art realizes that the present invention by no means is limited to the embodiments described above. For example, other distributions of the sections, other locking means for the annular sealing body, and other shapes and orientations of the annular flange than presented here are applicable and the sealing device may be used for other purposes than those explicitly mentioned here.

The invention claimed is:

1. A sealing device for garments to sealingly connect an annular layer and a wearable layer to said sealing device, said sealing device comprising:
   an annular base comprising:
      an inner annular wall portion, an outer annular wall portion extending circumferentially around said inner annular wall portion, a recess at least partly defined by said inner annular wall portion and said outer annular wall portion, and an annular sealing surface for circumferentially and sealingly connecting said annular layer to said annular base;
      an annular sealing body adapted to be locked into said recess to circumferentially and sealingly connect said wearable layer between said annular base and said annular sealing body;
      wherein at least one of said inner annular wall portion and said outer annular wall portion is provided with a plurality of sections in the circumferential direction, each section having a stiffness different from a stiffness of a neighbouring section.

2. A sealing device according to claim 1, wherein at least one section in said plurality of sections has a different thickness compared to its neighbouring section, said thickness being defined in the direction from said inner annular wall portion to said outer annular wall portion.

3. A sealing device according to claim 1, wherein at least one section in said plurality of sections comprises a first material, and wherein its neighbouring section comprises a second material, said second material being different from said first material.

4. A sealing device according to claim 1, wherein said inner annular wall portion and/or said outer annular wall portion comprises an annular strengthening portion connecting at least every other section with each other.

5. A sealing device according to claim 4, wherein said annular base comprises an annular shoulder arranged in said recess for preventing said annular sealing body to be released when locked into said recess, said annular shoulder being arranged on the same inner annular wall portion and/or said outer annular wall portion as said annular strengthening portion but on an opposite side to said annular strengthening portion.

6. A sealing device according to claim 1, wherein said annular base comprises an annular flange arranged circumferentially to said inner annular wall portion and/or said outer annular wall portion.

7. A sealing device according to claim 6, wherein said annular flange extends from said outer annular wall portion with an angle of over 90°.

8. A sealing device according to claim 6, wherein said annular flange is an extension of said inner annular wall portion.

9. A sealing device according to claim 6, wherein said annular sealing surface is arranged on said annular flange for circumferentially and sealingly connecting said annular layer by at least one of the following: adhesive means, welding, moulding, casting, laces.

10. A sealing device according to claim 1, wherein said annular sealing surface is arranged in said recess, and wherein said annular sealing body is adapted to be locked into said recess to circumferentially and sealingly connect said annular layer between said annular sealing surface and said annular sealing body.

11. A sealing device according to claim 1, wherein said annular sealing body is adapted to be snap fitted into said recess.

12. A sealing device according to claim 1, wherein said annular base comprises a flexible material e.g. plastic such as polyurethane, or rubber or silicone.

13. A sealing device according to claim 1, wherein said annular base is moulded, e.g. injection-moulded or casted.

14. A method of sealingly connecting an annular layer and a wearable layer comprising
  providing the sealing device of claim 1,
  sealingly connecting the annular layer to the wearable layer by adhesive means, welding, moulding, casting, and/or laces, and
  circumferentially and sealingly connecting the wearable layer by snap locking said annular sealing body into said recess.

15. A method for forming a sealing device according to claim 1, comprising the following steps:
  providing a first mould corresponding to the size and shape of the annular base,
  moulding, such as injection-moulding a plastic or moulding a rubber, into said first mould for forming said annular base,
  providing a second mould corresponding to the size and shape of the annular sealing body,
  moulding, such as injection-moulding a plastic or moulding a rubber, into said second mould for forming said annular sealing body, and
  releasing said annular base and said annular sealing body from said first mould and said second mould.

\* \* \* \* \*